(12) United States Patent
Tsai et al.

(10) Patent No.: US 9,273,824 B1
(45) Date of Patent: Mar. 1, 2016

(54) ADJUSTABLE SUPPORT STRUCTURE

(71) Applicants: Wen-Feng Tsai, Taipei (TW);
Cheng-Che Yu, Taipei (TW)

(72) Inventors: Wen-Feng Tsai, Taipei (TW);
Cheng-Che Yu, Taipei (TW)

(*) Notice: Subject to any disclaimer, the term of this patent is extended or adjusted under 35 U.S.C. 154(b) by 0 days.

(21) Appl. No.: 14/663,676

(22) Filed: Mar. 20, 2015

(51) Int. Cl.
| | |
|---|---|
| *A47B 96/06* | (2006.01) |
| *F16M 13/02* | (2006.01) |
| *F16M 11/12* | (2006.01) |
| *F16M 11/20* | (2006.01) |
| *B60R 11/00* | (2006.01) |

(52) U.S. Cl.
CPC ............ *F16M 13/022* (2013.01); *F16M 11/121* (2013.01); *F16M 11/2014* (2013.01); *F16M 11/2021* (2013.01); *B60R 2011/0017* (2013.01)

(58) Field of Classification Search
CPC ... F16M 13/022; F16M 11/121; F16M 11/08; F16M 11/10; F16M 11/2014; B60R 2011/017; B60R 2011/0059; B60R 2011/0089; B60R 2011/0071
USPC ................. 248/229.1, 229.11, 229.15, 229.2, 248/229.25, 230.1, 230.2, 230.6, 231.71, 248/309.1, 324, 689, 691
See application file for complete search history.

(56) References Cited

U.S. PATENT DOCUMENTS

| | | | | |
|---|---|---|---|---|
| 7,065,319 B1 * | 6/2006 | Hartley | ................... | G09B 19/00 434/307 R |
| 7,641,162 B2 | 1/2010 | Tsai | | |
| 8,091,843 B2 * | 1/2012 | Tsai | ....................... | A47K 10/10 248/205.5 |
| 8,109,479 B1 * | 2/2012 | Tsai | ........................ | F16B 47/00 248/205.5 |
| 8,302,920 B2 | 11/2012 | Tsai | | |
| 9,133,982 B1 * | 9/2015 | Valdez | ................. | F16M 13/022 |
| 2009/0189033 A1 | 7/2009 | Lin | | |
| 2010/0164241 A1 | 7/2010 | Finck | | |
| 2013/0206942 A1 * | 8/2013 | Trotsky | ................ | F16M 11/041 248/274.1 |

FOREIGN PATENT DOCUMENTS

| | | | | |
|---|---|---|---|---|
| TW | 202011051755 U1 * | 11/2011 | ........... | F16M 11/041 |
| WO | WO 2014161022 A1 * | 10/2014 | ............. | B60R 11/02 |

* cited by examiner

*Primary Examiner* — Todd M Epps

(57) ABSTRACT

An adjustable support structure includes a mounting base, a support arm pivotally connected to the mounting base, two swivel arms respectively pivotally connected to opposing left and right sides of the support arm for hooking on a respective post, and two chucks respectively slidably coupled to respective shanks of the swivel arms and movable by respective locknuts for stopping one respective post in the hooks of the swivel arms to lock the swivel arms to the posts.

2 Claims, 3 Drawing Sheets

ADJUSTABLE SUPPORT STRUCTURE

FIELD OF INVENTION

The present invention relates to support devices and more particularly, to an adjustable support structure.

BACKGROUND

Many vacuum mount type and plug type support devices are commercially available for use in a car to support a CD player, computer, LCD display device, or other any other load. These support devices are commonly designed for installation in a front seat. Conventionally, support devices for mounting at vehicle back seats are commonly complicated. Their installation must be performed by professional people.

SUMMARY OF THE DESCRIPTION

The objective of the present invention is to provide an adjustable support structure, which is practical for use in a vehicle back seat to support an electronic device on two posts in a car, and allows adjustment of the angular position of the supported an electronic device relative to the posts.

To achieve this and other objects of the present invention, an adjustable support structure comprises a mounting base, a support arm pivotally connected to the mounting base, two swivel arms respectively pivotally connected to opposing left and right sides of the support arm, each swivel arm comprising an externally threaded shank connected to the support arm, a hook extended from one end of the externally threaded shank remote from the support arm for hooking on a post and a locknut threaded onto the externally threaded shank, and two chucks respectively coupled to the swivel arms and movable by the respective locknuts along the respective swivel arms for stopping against one respective post in the hooks of the swivel arms.

Further, the mounting plate of the mounting base is rotatable relative to the mounting base.

Other advantages and features of the present invention will be fully understood by reference to the following specification in conjunction with the accompanying drawings, in which like reference signs denote like components of structure.

DETAILED DESCRIPTION

Figure 1:
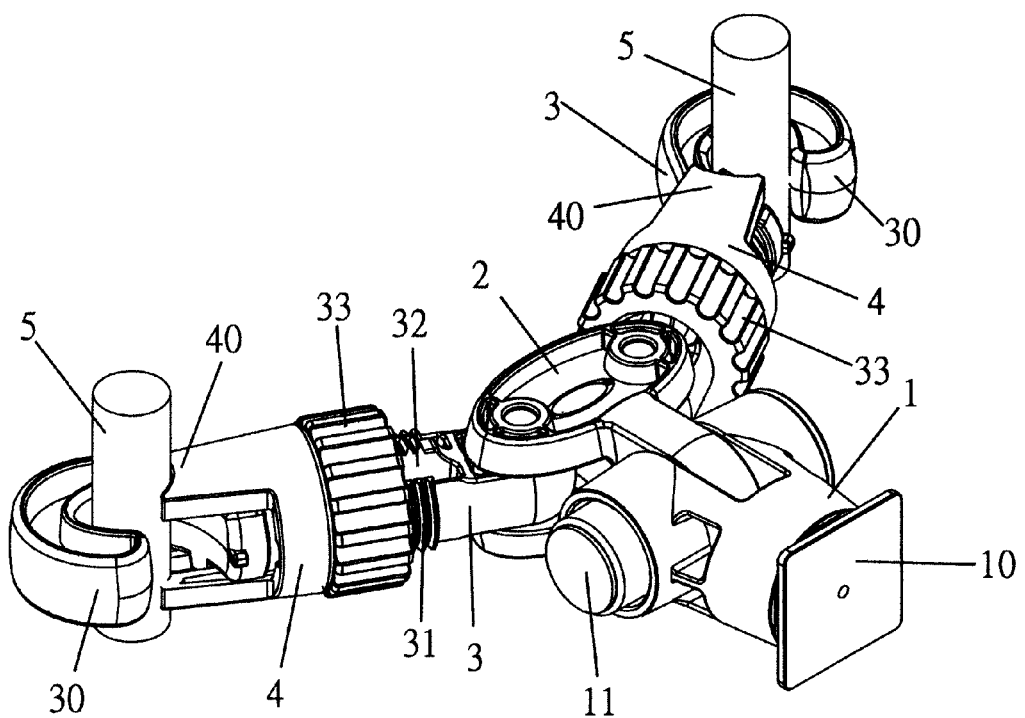
FIG. 1 is an elevational view of an adjustable support structure in accordance with the present invention.
Figure 2:
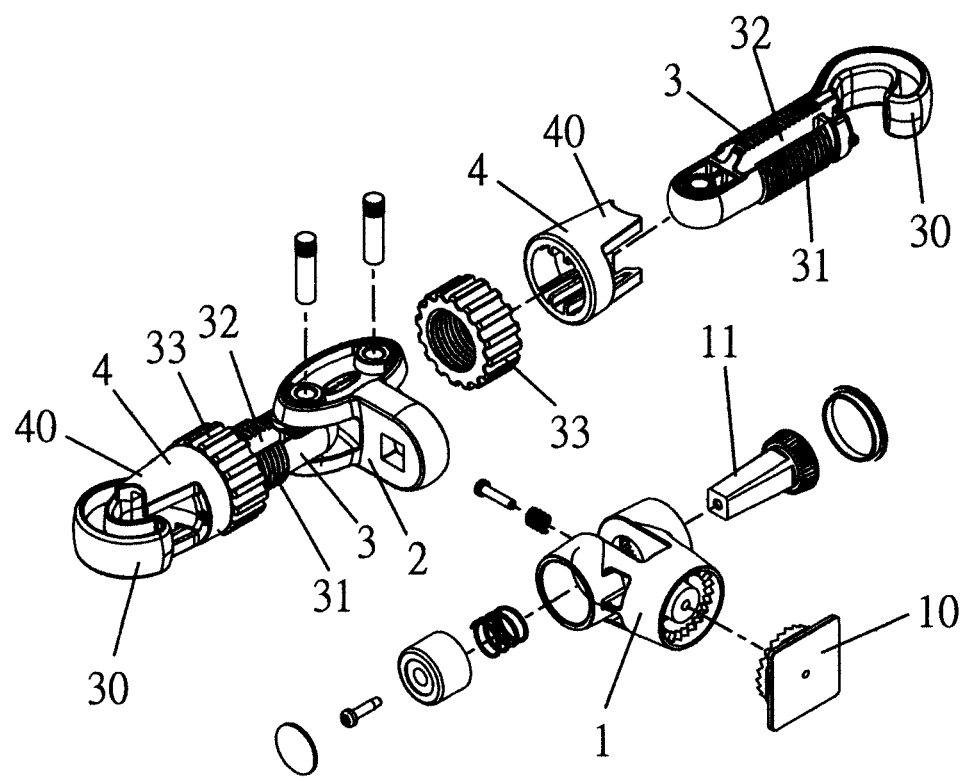
FIG. 2 is an exploded view of the adjustable support structure in accordance with the present invention.
Figure 3:
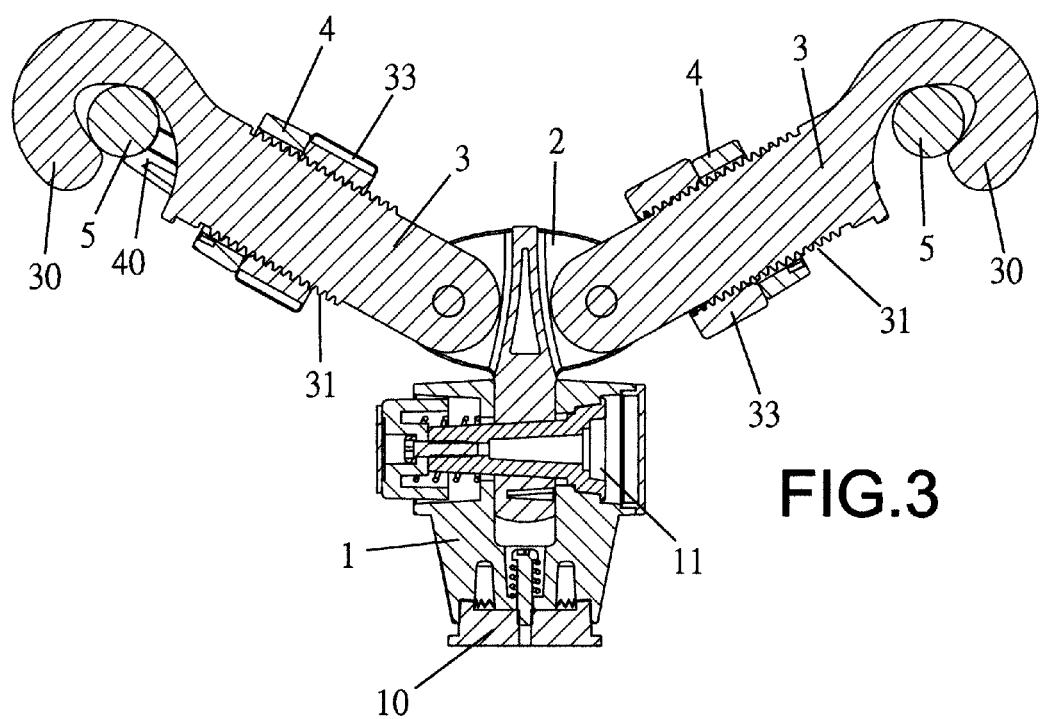
FIG. 3 is a sectional view of the adjustable support structure in accordance with the present invention.

Referring to FIGS. 1, 2 and 3, an adjustable support structure in accordance with the present invention is shown comprising a mounting base 1, a support arm 2, two swivel arms 3, and two chucks 4.

The mounting base 1 comprises a mounting plate 10 rotatably located at one end thereof. The support arm 2 is pivotally connected to an opposite end of the mounting base 1 and locked thereto by a transverse pivot connection device 11.

The two swivel arms 3 are respectively pivotally connected to opposing left and right sides of the support arm 2. Each swivel arm 3 comprises an externally threaded shank 31 connected to the support arm 2, a plurality of longitudinal sliding grooves 32 located on the periphery of the externally threaded shank 31 and extending along the length of the externally threaded shank 31, a hook 30 extended from one end of the shank 31 remote from the support arm 2 for hooking on a post 5, and a locknut 33 threaded onto the externally threaded shank 31. The chucks 4 are coupled to the longitudinal sliding grooves 32 of the externally threaded shanks 31 of the swivel arms 3 and movable by the respective locknut 33 along the longitudinal sliding grooves 32 of the externally threaded shanks 31 of the swivel arms 3, each comprising two parallel chucking arms 40 facing toward the hooks 30 of the swivel arms 3 for holding down the respective posts 5.

During application of the present invention, hook the hooks 30 of the swivel arms 3 on the posts 5 respectively, and then rotate the locknuts 33 to move the chucks 4 along the longitudinal sliding grooves 32 of the externally threaded shanks 31 of the swivel arms 3 toward the respective hooks 30, forcing the chuck arms 40 of the chucks 4 into positive engagement with the posts 5. Thus, the swivel arms 3 are locked to the respective posts 5. Thereafter, the user can adjust the angular position of each swivel arm 3 relative to the support arm 2 and the angular position of the support arm 2 relative to the mounting base 1. Further, the mounting plate 10 of the mounting base 1 can be fastened to a cell phone, CD player, computer, LCD display device, or any other load to be supported on the posts 5.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An adjustable support structure, comprising:
   a mounting base comprising a mounting plate located at one end thereof;
   a support arm pivotally connected to an opposite end of said mounting base and locked thereto by a transverse pivot connection device;
   two swivel arms respectively pivotally connected to opposing left and right sides of said support arm, each said swivel arm comprising an externally threaded shank connected to said support arm, a plurality of longitudinal sliding grooves located on the periphery of said externally threaded shank and extending along the length of said externally threaded shank, a hook extended from one end of said externally threaded shank remote from said support arm for hooking on a post, and a locknut threaded onto said externally threaded shank; and
   two chucks respectively coupled to said longitudinal sliding grooves of said swivel arms and movable by said locknuts along said longitudinal sliding grooves of said swivel arms respectively for stopping against one respective post in said hooks of said swivel arms, each said chuck comprising two parallel chucking arms respectively facing toward the hooks of said swivel arms.

2. The adjustable support structure as claimed in claim 1, wherein said mounting plate of said mounting base is rotatable relative to said mounting base.

* * * * *